M. COUGHLIN.
NUT LOCK.
APPLICATION FILED OCT. 22, 1919.
1,372,485.
Patented Mar. 22, 1921.
FIG. I.
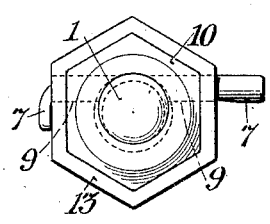
FIG. II.
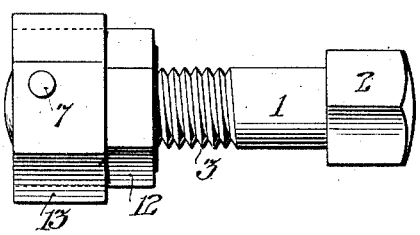
FIG. III.
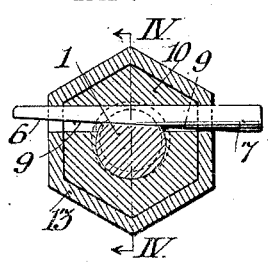
FIG. IV.
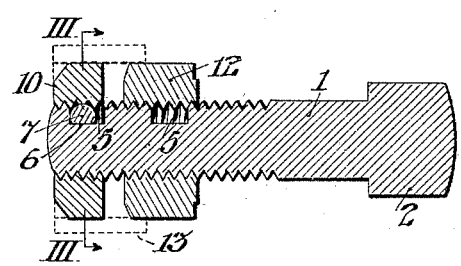
FIG. V.
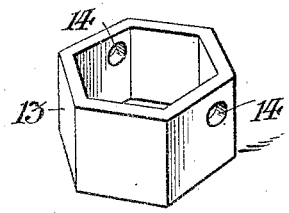
INVENTOR:
MICHAEL COUGHLIN,

UNITED STATES PATENT OFFICE.

MICHAEL COUGHLIN, OF TACONY, PENNSYLVANIA.

NUT-LOCK.

1,372,485. Specification of Letters Patent. Patented Mar. 22, 1921.

Application filed October 22, 1919. Serial No. 332,507.

*To all whom it may concern:*

Be it known that I, MICHAEL COUGHLIN, a citizen of the United States, residing in Tacony, in the county of Philadelphia and State of Pennsylvania, have invented a certain new and useful Improvement in Nut-Locks, whereof the following is a specification, reference being had to the accompanying drawing.

My invention is particularly designed for locking nuts upon the bolts with which fish plates are clamped at the joints between successive lengths of railroad rails. However, it is to be understood that my invention may be applied to nuts upon bolts of other kinds.

My invention is of particular advantage in such railroad structures in that it affords positive means for preventing any turning movement of a nut upon the bolt with which it is connected, unless and until it is desired to manually adjust the same, and then affords means for facilitating such adjustment.

As hereinafter described, my invention includes the combination with a bolt having a main nut, of ordinary construction, of an auxiliary nut, which is not a jam nut in any sense, but is detachably rigidly connected with said bolt by means of a wedge pin extending through said auxiliary nut in eccentric relation to said bolt and in engagement with the latter. Said auxiliary nut, thus made a detachable fixture upon the bolt, is of the same configuration as the main nut and serves to hold a sleeve, detachably connected with said auxiliary nut by the same wedge pin but fitting over the outer end of the main nut so as to prevent rotation of the latter; the axial extent of said sleeve being sufficient, however, to allow of such axial adjustment of the main nut as is desired, when said sleeve is temporarily removed from said auxiliary nut.

My invention includes the various novel features of construction and arrangement hereinafter more definitely specified.

In the drawing: Figure I is an end view of a bolt and nut provided with a convenient embodiment of my invention.

Fig. II is a side elevation of said structure shown in Fig. I.

Fig. III is a cross sectional view of said structure, taken on the line III, III in Fig. IV.

Fig. IV is a longitudinal sectional view of said structure, taken on the line IV, IV in Figs. I and III, but with the locking sleeve removed.

Fig. V is a detached perspective view of said locking sleeve, shown in the other figures.

In said figures; 1 is the bolt conveniently provided with the hexagonal head 2 and having its screw thread 3 of ordinary construction, except that it is interrupted by one or more recesses 5 which, as shown in Fig. III, preferably extend radially inward beyond the roots of said threads, to afford a flattened seat for the inclined plane wedge face 6 of the wedge pin 7 which is otherwise cylindrical and conveniently formed of ordinary commercial cylindrical wire. As shown in Figs. I, II and III; when in operative position, said pin extends through oppositely alined cylindrical holes 9 in the auxiliary nut 10, and it is to be noted that said holes are so spaced that their outer edges extend outwardly beyond the crests of the screw thread 11, in said nut 10 so as to form a continuous support at the outer edge of said pin 7 and thus brace the latter to resist any turning stresses between said nut and bolt. Said auxiliary nut 10, thus detachably fixed upon said bolt 1, is of the same configuration as the main nut 12 and serves to hold the sleeve 13, which is detachably connected with said auxiliary nut by said wedge pin 7, when in the locking position shown in Figs. I, II and III; in which position said sleeve fits over the outer end of said main nut, so as to prevent rotation of the latter. However, the axial extent of said sleeve is sufficient to allow of such axial adjustment of said main nut 12 as is desired, when said sleeve is temporarily removed from said auxiliary nut, as shown in Fig. IV. As shown in Fig. I; said pin may be secured in the locked position by bending the thin end of said pin into engagement with the outer face of said sleeve. However, said pin end may be upturned, as shown in Fig. III, and said pin driven out to permit the removal of said sleeve, as indicated in Fig. IV. Thereupon, said main nut 12 may be adjusted axially in either direction without disturbing the position of said auxiliary nut 10. When in adjusted position; said nuts 10 and 12 are alined with each other as shown, so that said sleeve 13 may be slipped thereover and reëngaged by said pin 7, extending through the sleeve holes 14.

I find the construction and arrangement illustrated to be most convenient for ordinary purposes as it permits of an extensive range of adjustment of the locking device without unduly enlarging the latter. However, it may be observed, with reference to Fig. IV, that the capacity of the structure above described for locking said main nut 12 may be varied by several factors. As shown, the recess 5 in said bolt 1 in which said pin 7 is engaged is of such axial extent that said auxiliary nut 10 may be axially adjusted to the extent of one thread on said bolt, employing the same recess 5 to hold said pin 7 and, of course, said recess may be lengthened so that said auxiliary nut may be thus adjusted to the extent of two or more threads. However, I find it convenient to provide bolts with a series of such recesses, as indicated in Fig. IV, rather than to make a single recess of greater axial extent. Moreover, the locking capacity of the device may be varied by employing sleeves 13 of greater or less extent.

Although I have shown a locking sleeve of hexagonal configuration, because I find it convenient to employ ordinary commercial hexagonal nuts, and it is desirable to render the main nut adjustable in steps of not more than one-sixth of a revolution; it is to be understood that I may employ square sleeves adapted to fit ordinary square nuts, or sleeves of other shapes corresponding with other shapes of nuts. For instance, octagonal nuts are employed for many purposes and triangular nuts are employed in some forms of fire extinguishing apparatus and, of course, my invention is applicable to them.

It is only as a matter of convenience that I have employed locking sleeves which are of the same configuration throughout their length; because they may be thus readily formed from commercial tubing. Of course, they may be otherwise shaped. Moreover, as the auxiliary nut 10 is secured to the sleeve by the pin 7, it is unnecessary to make its outer circumference polygonal to engage the sleeve, and it may be circular, or any other convenient shape.

Therefore, I do not desire to limit myself to the precise details of construction and arrangement herein set forth, as it is obvious that various modifications may be made therein, without departing from the essential features of my invention as defined in the appended claims.

I claim:

1. In a nut locking device; the combination with a screw threaded bolt, having a plurality of axially spaced segmental recesses in the circumference of its threaded portion; of a main nut axially adjustable on said screw thread; a sleeve adapted to fit over said main nut and shaped to prevent relative rotation of said nut and sleeve; means detachably securing said sleeve in connection with said bolt, including an auxiliary nut fitted for axial adjustment on said bolt and having cylindrical holes in its opposite sides axially alined transversely to the axis of said bolt, and adapted to selectively register with said recesses; and a wedge pin, formed of cylindriform wire fitted to extend through the holes in said auxiliary nut and having an inclined plane wedge face fitted to the inner wall of said recess; the thin end of said pin being flexible exterior to said sleeve to prevent accidental withdrawal of said pin.

2. In a nut locking device; the combination with a screw threaded bolt, having a plurality of axially spaced segmental recesses in the circumference of its threaded portion; of a main nut axially adjustable on said screw thread; a sleeve adapted to fit over said main nut and shaped to prevent relative rotation of said nut and sleeve; means detachably securing said sleeve in connection with said bolt, including an auxiliary nut fitted for axial adjustment on said bolt and having holes in its opposite sides extending transversely to the axis of said bolt, and adapted to selectively register with said recesses; and a wedge pin, fitted to extend through the holes in said auxiliary nut and having an inclined plane wedge face fitted to the inner wall of said recess; the thin end of said pin being flexible exterior to said sleeve to prevent accidental withdrawal of said pin.

3. In a nut locking device; the combination with a screw threaded bolt, having a segmental recess in the circumference of its threaded portion; a main nut axially adjustable on said screw thread; a sleeve adapted to fit over said main nut and shaped to prevent relative rotation of said nut and sleeve; means detachably securing said sleeve in connection with said bolt, including an auxiliary nut fitted for axial adjustment on said bolt and having holes in its opposite sides extending transversely to the axis of said bolt, and adapted to register with said recess in different axial positions; and a wedge pin, fitted to extend through the holes in said auxiliary nut and having a wedge face fitted to said recess; said pin being flexible to prevent accidental withdrawal of said pin.

4. In a nut locking device; the combination with a screw threaded bolt, having a segmental recess in the circumference of its threaded portion; a main nut axially adjustable on said screw thread; a sleeve adapted to fit over said main nut and shaped to prevent relative rotation of said nut and sleeve; means detachably securing said sleeve in connection with said bolt, including an auxiliary nut on said bolt and having holes in its opposite sides extending transversely to the axis of said bolt, and adapted to register with said recess; and a wedge pin, fitted to extend through the holes in said auxiliary nut and having a wedge face fitted to said recess; said pin being flexible to prevent accidental withdrawal of said pin.

5. In a nut locking device; the combination with a screw threaded bolt, having a plurality of axially spaced recesses in the circumference of its threaded portion; of a main nut axially adjustable on said screw thread; a sleeve adapted to fit over said main nut and shaped to prevent relative rotation of said nut and sleeve; and means detachably securing said sleeve in connection with said bolt, including a wedge pin, fitted to selectively engage said recesses; the thin end of said pin being flexible to prevent accidental withdrawal of said pin.

6. In a nut locking device; the combination with a screw threaded bolt, having a recess in the circumference of its threaded portion; of a main nut axially adjustable on said screw thread; a sleeve adapted to fit over said main nut and shaped to prevent relative rotation of said nut and sleeve; and means, detachably securing said sleeve in connection with said bolt, including a wedge pin, fitted to said recess; said pin being flexible exterior to said sleeve to prevent accidental withdrawal of said pin.

7. In a nut locking device; the combination with a screw threaded bolt, having its threaded portion of uniform diameter and pitch and having a recess in the circumference of its threaded portion; of a main nut axially adjustable on said screw thread; a sleeve adapted to fit over said main nut and shaped to prevent relative rotation of said nut and sleeve; and means, detachably securing said sleeve in connection with said bolt, including a wedge pin, fitted to said recess.

8. In a nut locking device; the combination with a screw threaded bolt, having its threaded portion of uniform diameter and pitch and having a recess in its circumference; of a main nut axially adjustable on said screw thread; a sleeve adapted to prevent relative rotation of said nut and sleeve; and means detachably securing said sleeve in connection with said bolt, including an auxiliary nut on said thread, and a wedge connecting said sleeve with said auxiliary nut, and engaging said recess.

9. In a nut locking device; the combination with a screw threaded bolt, having its threaded portion of uniform diameter and pitch and having a recess in its circumference; of a main nut axially adjustable on said screw thread; a sleeve adapted to prevent relative rotation of said nut and sleeve; and means detachably securing said sleeve in connection with said bolt, including an auxiliary nut on said thread, and a wedge connecting said sleeve with said auxiliary nut.

10. In a nut locking device; the combination with a screw threaded bolt, having its threaded portion of uniform diameter and pitch and having a recess in its circumference; of a main nut axially adjustable on said screw thread; a tubular sleeve adapted to encircle said nut and prevent relative rotation of said nut and sleeve; and means detachably securing said sleeve in connection with said bolt, including a nut on said thread.

11. In a nut locking device; the combination with a male screw threaded element and a nut to be locked thereon; of a uniformly tubular sleeve adapted to fit said nut circumferentially and shaped to prevent relative rotation of said nut and sleeve; and wedge means independent of said nut detachably securing said sleeve in connection with said male element, preventing relative rotation thereof.

12. In a nut locking device; the combination with a male screw threaded element and a nut to be locked thereon; of a uniformly tubular sleeve adapted to engage the circumference of said nut and prevent relative rotation of said nut and sleeve; and means independent of said nut detachably securing said sleeve in connection with said male element, preventing relative rotation thereof.

13. An article of manufacture including a uniformly tubular polygonal sleeve, having axially alined cylindrical holes, of the same size, in opposite walls, the axis of said holes being transverse and eccentric to the axis of said tube.

In testimony whereof, I have hereunto signed my name at Tacony, Pennsylvania, this twenty-ninth day of September, 1919.

MICHAEL COUGHLIN.

Witnesses:
JOHN J. ALBERT,
JOHN MARNIEN.